United States Patent Office

2,911,379
Patented Nov. 3, 1959

2,911,379

USE OF ALKALINE MATERIALS IN THE PREPARATION OF POLYURETHANE FOAMS

Earl E. Parker, Allison Park, and Keith H. Coultrap, Pittsburgh, Pa., assignors to Pittsburgh Plate Glass Company No Drawing. Application July 11, 1955
Serial No. 521,414

4 Claims. (Cl. 260—2.5)

This invention relates to polyesters suitable for making flexible polyurethane resins of the foamed or cellular type.

Polyesters suitable for reacting with a diisocyanate to form flexible polyurethane resins have heretofore been prepared by esterification of an alcohol containing a plurality of hydroxyls and an acid containing a plurality of carboxyls. Usually the alcohol component of the polyester is a mixture of one or more dihydric alcohols and one or more polyhydric alcohols containing at least three hydroxyls and customarily the polyester includes available hydroxyls, and in fact, the alcohol or alcohol mixture employed in producing the polyester is usually in substantial excess of stoichiometric ratio with respect to the carboxyl groups so that the number of available hydroxyls in the polyester is quite substantial. These unreacted hydroxyls will react with the isocyanate groups of the diisocyanate to produce urethane linkages which bridge together polyester chains; apparently terminal isocyanate groups remain on the urethane chains and if water is present in the mixture, there is a reaction to form urea linkages between the various chains and concomitantly, to liberate carbon dioxide. The hydrogens on the nitrogen of the urea linkages are susceptible of further reaction with isocyanate groups on contiguous chain molecules or with unreacted diisocyanate molecules to provide three dimensional, giant molecules. The foregoing reactions have been described in the journal "Rubber Chemistry and Technology" by O. Bayer et al., volume 23, pages 812 through 835 inclusive, and again by A. C. Stevenson, "Rubber Age," volume 77, Number 1, pages 63–68.

The carbon dioxide liberated in the course of the reaction may be entrapped in the polyester, which by reason of the extension and cross-linking of the molecules through the several reactions, is converted into the solid state thus providing valuable cellulated resin products.

By appropriate control of the reaction and the components entering into it, this product can be tailored to provide foams or cellulated products of high density or low density and also to obtain a high degree of flexibility or low degree of flexibility as many be desired. For example, if the alcohol component of the polyester is of such character as to provide a great excess of unreacted hydroxyls and especially if it contains considerable amounts of alcohol, such as glycerol, pentaerythritol, or the like, containing three or more hydroxyls per molecule, the foams obtained by reaction of the polyester with diisocyanate in the presence of water, tend to be relatively rigid. On the other hand, if the polyester component is of but moderate hydroxyl value and/or contain but little polyhydroxyl alcohol, the resultant foams tend to be relatively flexible. By proper adjustments, the density of the foams may also be regulated. High proportions of water tend to form products of low density.

For some purposes, in the preparation of cushions for furniture or automobiles, or for the construction of mattresses or the like, a high degree of softness of the flexible foams is desirable. This softness of feel can not always be obtained in the foams prepared by conventional techniques. Furthermore, it has been found that the curves plotted between pressure or stress and yield or distortion of the conventional foams tend to be irregular and to involve plateaus or benches where increase of stress per unit area upon the foam over a substantial range produces but slight deformation, or where slight changes of stress tend to produce excessive deformation. After the plateau or bench has been passed or before it is reached, the change of distortion with increase or decrease of stress tends to follow a more uniform pattern. Foams for cellular resins, in which the curves plotted between pressure and yield or distortion possess these characteristics, are not well adapted for use in the construction of cushions, mattresses or the like.

This invention is based upon the discovery that the incorporation of certain relatively stable and relatively alkaline compounds, and notably of water soluble salts of such strong bases as the alkali metals with relatively weak acids, can be incorporated into foamable water-containing mixtures of diisocyanates and polyesters to provide products which when cured, have improved characteristics in one or more of several respects. For example, the foams may be obtained in relatively low density connoting a higher degree of cellularity. This is often desirable in flexible foams. Furthermore, in the flexible foams, a very high degree of softness can be obtained. Likewise, in the flexible foams, it has been found that the incorporation of salts results in a product in which the curves plotted between distortion and weight or stress per unit area tends to be quite smooth and uniform. Accordingly, the foams are well adapted for use in the construction of cushions, mattresses and similar structures.

Relatively strongly alkaline compounds which may be used in the practice of the present invention comprise the sodium or potassium salts and being represented by:

|  | pH |
|---|---|
| Sodium carbonate | 12.2 |
| Sodium sulfide | 14.2 |
| Sodium borate |  |
| Sodium citrate |  |
| Potassium carbonate | 12.1 |
| Trisodium phosphate, .12$H_2O$ | 13.1 |

The pH values are calculated upon the basis of 0.3 grams of the compound in 2 grams of water. Preferably, these compounds are of an alkalinity in a range characterized by pH values in the range of above 9 or 10 and below 15 at a concentration of 0.3 gram in 2 grams of water.

Such strongly alkaline materials as the hydroxides of the alkaline metals, e.g., sodium or potassium hydroxide and aqueous solutions of stable organic bases such as the hydroxides and the carbonates of quaternary ammonium compounds, e.g., trimethyl benzyl ammonium hydroxide, or the carbonate thereof; triethyl benzyl ammonium hydroxide or its carbonate may also be employed to impart softness and/or other desired properties to the foamed products. Compounds with high pH values, e.g., 13 or above, preferably should be diluted substantially, for example, to a normality in a range of about 1.0 to 0.001. Higher normalities tend to produce gelation in such short time that it may be difficult to obtain complete mixture of the several components before setting occurs. The total amount of water available for dilution of the alkaline material usually will be in a range of about 0.5 to 5 percent by weight based upon the polyester. Some of this may be residual water of reaction in the latter, though it is preferred that enough water be added to incorporate the alkaline material as a solution. In many instances, the amount of water will exceed that required to dissolve the alkaline material. This is especially true in the instance of such strong bases as sodium hydroxide or potassium hydroxide. If desired, some of the water may be added with the alkaline material and a part may be added separately either before or after the addition of the solution of alkaline material.

In the preparation of the polyester of the foamable compositions of the present invention, various dicarboxylic acids may be employed and being represented by the alkyl dicarboxylic acids such as:

Succinic acid
Adipic acid
Sebacic acid
Azelaic acid and others containing from about 4 to 10 or more $CH_2$ groups in the chain between the carboxyls. Those acids in which hydrogens in the chains are in part replaced by chlorine or methyl or other non-functioning groups are within the purview of the invention.

Still other dicarboxylic acids which may be employed in preparing the polyester are represented by aromatic mononuclear dicarboxylic acids, particularly phthalic acid, terephthalic acid, isophthalic acid and the like. Although these aromatic acids contain double bonds between carbon atoms they appear to be substantially non-functioning in the polyesters constituting the present invention. In the aromatic dicarboxylic acids, one or more of the hydrogen atoms of the ring may be replaced by chlorine or by methyl groups.

Of the various dicarboxylic acids which may be employed in the practice of the invention, particular emphasis is to be placed upon adipic acid which alone or in admixture with other of the aliphatic and aromatic dicarboxylic acids herein disclosed or contemplated has been found to yield polyesters which can be reacted with diisocyanates to form foams of very high merit.

The alcohol component of the polyester employed in making the flexible foams of this invention usually includes at least some dihydric alcohol, such as:

Ethylene glycol
Diethylene glycol
Triethylene glycol
Tetraethylene glycol or polyglycols comprising chains of ethylene glycol terminated by hydroxyls and being of molecular weights up to 5,000 to 6,000. Still other alcohols comprise: 1,3- or 1,2-propylene glycol, dipropylene glycol, butylene glycol and its isomers and others. Those glycols comprising one or more ether linkages and being represented by diethylene glycol and triethylene glycol have been found to be excellent for the purposes of the present invention. Mixtures of one or more of the dihydric compounds listed may be formed. Likewise, the dihydric component may sometimes be employed to the exclusion of alcohols containing greater numbers of hydroxyls. The polyesters often and indeed usually contain substantial amounts of alcohols containing three or more hydroxyls and being represented by glycerol, pentaerythritol, trimethylol ethane, trimethylol propane, mannitol and others. The polyhydric alcohols containing three or more hydroxyls may be employed to the substantial exclusion of dihydric alcohols. However, in most instances it is preferable to tailor the polyesters by the mixing of the two types of alcohols, the dihydric alcohol component tending to increase the flexibility of the product while the polyhydric alcohol component tends to increase the stiffness. The sum of the alcohol components preferably is substantially in excess of the carboxyls present in the acid component and such excess may extend for example from 5 or 10 percent up to 50 or 60 percent or more based upon stoichiometric proportions.

The esterification reactions employed in the preparation of the polyesters are substantially conventional and comprise heating the mixture with acid esterification catalysts such as a sulfonic acid, in well known manner, to a temperature to effect the evolution of water, e.g. up to about 250° F. to 400° F. or thereabouts. The reaction may be effected in the presence of a non-reactive diluent such as xylene which will distill azeotropically thus to assist in carrying away the water of reaction whereby to promote esterification. The reaction preferably is continued until the product is viscous but liquid, or at least becomes liquid when heated. The acid value usually is reduced to a comparatively low point, for example below 20, and preferably below 12 or 15. The polyesters of an acid value of 1 or below are obtainable and may be reacted with diisocyanates in the presence of alkaline salts in accordance with the provisions of this invention.

In a polyester which is to be used in preparing a flexible foam the hydroxyl value preferably is in a range of about 15 to 160. The quotients of hydroxyls divided by carboxyls are usually comparatively high, for example in a range of about 10 or 20 up to 500 or 600. For the preparation of the more flexible foams the ratio of hydroxyls/carboxyls preferably are in the lower portion of this range, for example from about 40 to about 100 or 150.

The polyester component may be mixed with a wide variety of diisocyanates in such amounts as to provide substantial excesses of diisocyanate molecules as compared with available hydroxyls. Diisocyanates which interact with polyesters in the presence of the salts herein disclosed possess the structure $O=C=N-R-N=C=O$, where R is aromatic, heterocyclic, aliphatic or a mixed group comprising moeties from two or more of these classes. Preferably, it contains from about 2 to 19 carbon atoms. The hydrocarbon group may also contain chlorine or other substantially non-reactive groups. The following constitutes an illustrative group of diisocyanates which may be employed in the practice of the invention:

Diphenyl diisocyanate
Triphenyl diisocyanate
Chlorophenyl-2,4-diisocyanate
Ethylene diisocyanate
1,4-tetramethylene diisocyanate
p-Phenylene diisocyanate
Tolylene diisocyanate (preferably as a mixture of isomers)
p,p'-Diisocyanate diphenylmethane
Hexamethylene diisocyanate, and others The tolylene diisocyanate mixed isomers, because of general availability and satisfactory operation in the process, are presently preferred, though of course, as commercial conditions change this preference is also subject to change. Common sources of mixed isomers are sold as Mondur-TD and Hylene-TM, which contain a mixture of 2,4-tolylene diisocyanate and 2,6-diisocyanate. The use of the isomers as individuals is not precluded, but usually a mixture containing the 2,4-tolylene diisocyanate in a range of about 60 to 80 percent of the combined mixture of 2,4 and 2,6 isomers is preferred as having better general properties.

Diisocyanate may be employed in an amount to provide at least one isocyanate group per available hydroxyl and this proportion of the diisocyanate may be greatly extended and may extend for example up to 4 or more isocyanate groups for the total of the sum of the hydroxyls and the carboxyls available in the polyester component.

The salts of the alkali metals and the weak acids, having an alkalinity in the range herein specified possess catalytic activity, but usually it is preferred to employ them in the interpolymerizable foamable mixtures of polyesters and diisocyanate in conjunction with more conventional catalysts and notably the tertiary amines as represented by triethylamine, dimethyl ethanol amine, or the N-alkyl morpholines, or more specifically by N- methyl morpholine, N-ethyl morpholine and N-lauryl morpholine.

Compounds designed to yield catalytic tertiary amines under the conditions involved in the reaction of the diisocyanate with the polyester are also contemplated as being within the scope of the invention. For example, the quaternary ammonium compounds which decomposes under reaction conditions to form a tertiary amine may be employed. The quaternary ammonium compound should also be soluble in the foamable mixture. The quaternary ammonium salt of N-methyl morpholine and acetic anhydride, when incorporated into the mixture in conjunction with a latent hydrating agent such as the trihydrate of the sodium salt of acetic acid provides an excellent catalytic effect, but this effect is substantially retarded or delayed and apparently requires the liberation of water from the hydrated salt before it attains full headway. The quaternary ammonium salts are especially useful in those instances where a substantial interval between the mixing of the polyester with the diisocyanate and the ultimate reaction of molecular interbridging and of generation of carbon dioxide is desired.

Latent hydrating agents, for incorporation with the mixture of polyester and diisocyanate include the salts containing water of hydration, already referred to and being represented by the trihydrate of the sodium salt of acetic acid, Glauber's salt and others. These salts employed as latent sources of water do not substantially influence the desired properties of the ultimate resin product. They do not replace the salts of the type of sodium carbonate or others herein defined. The hydrated salt may be used as sources of water with N-methyl morpholine, as well as the quaternary ammonium salts.

The hydrated salts should be employed in an amount to provide an amount of water equivalent to the free water which would be required to attain desired foaming action. They are usually added as finely divided powders.

In order to promote the dispersion of the polyester, diisocyanate and catalyst, it is usually preferred to incorporate an emulsifying agent into one or both of the polyester and diisocyanate components. Appropriate emulsifiers which are found successfully to promote the distribution of the relatively mutually insoluble components, comprise the many emulsifying agents which are available as commercial products upon the market.

One such emulsifier is sold by the Emulsol Corporation under the trade name of Emcol-H-77. This is a liquid emulsifier and is understood to be a mixture of an anionic and a non-ionic emulsifier, one being a polycarboxylic acid blend and the other being a sulfonated fatty acid. Another valuable emulsifier comprises Alipal-CO-436, sold by the Antara Chemical Division which is a division of the General Dyestuff Corporation. This material is understood to be a sulfate ester of an alkyl phenoxy polyoxyethylene ethanol. A still further emulsifier is sold as Emulphor-EL-719 which is understood to be polyoxyethylated vegetable oil. Such emulsifiers as Triton-X-100, which is understood to be a condensate of an alkyl phenol and ethylene oxide; Tween-40 which is understood to be a polyoxyethylene sorbitan monopalmitate ethylene oxide reaction product as well as Tween-60 which is understood to be a sorbitan monostearate-ethylene oxide reaction product may also be used.

The foregoing emulsifying agents may be employed in an amount of approximately 1/10 of 1 percent to 5 or 10 percent based upon the emulsifiable mixture.

In conducting the reaction between the diisocyanate and the polyester several techniques have been recognized. The completed mixture after it is formed, foams and gels very quickly, accordingly, caution must be observed in assembling them to prevent premature reaction. It is preferred to make up an emulsion of polyester, water, catalyst, alkaline material and emulsifier as a separate package (A) and then to add the diisocyanate or a prepolymer containing partially reacted diisocyanate as a package (B). If the diisocyanate is added as a prepolymer, catalyst can be in either or both packages.

Mixing of A and B may be effected by rapid agitation in a container which may be a mold. It may also be conducted in a container and the mixture may then be quickly poured into a mold or spread upon a surface.

The two components constituting packages A and B may also be mixed by spraying them concurrently upon the same surface by use of a spray system having orifices for each individual component. When so applied to a surface, the two components mix externally of the spray gun and upon the surface to support the foam. There is no gelling action in the spray apparatus itself. The mixture, regardless of the techniques of mixing, when formed foams and gels very quickly. If desired, it can be further heated to effect a final cure. If the mixture includes a strongly alkaline material such as sodium carbonate and if the polyester is properly selected, the product obtained will be of a high degree of cellularity, the cellular product will be very soft and will produce a curve between deflections and pressures which is quite smooth and regular.

A third system which may be employed in preparing the foamed interpolymer comprises the preparation of a so-called prepolymer in which the polyester component or preferably a portion thereof, e.g. 30 to 70 percent, is incorporated with all of the diisocyanate component required to form the foam. If the polyester is reasonably anhydrous, it can be reacted with the diisocyanate by allowing the mixture to stand in the presence of a catalyst or by appropriately heating the mixture. The prepolymer thus formed is relatively highly fluid and does not, in the absence of water, produce a foam. When it is desired to form the foam, the prepolymer may be mixed with water or a powder of a hydrated salt and the alkaline salt contemplated by this invention, or preferably with added polyester containing those ingredients.

The mixing of the polyester emulsion and the prepolymer may be conducted merely by agitating the two components together. Also the two components may be applied to a suitable supporting surface by spraying from separate orifices.

The diisocyanate may also be added as a prepolymer with a part of the polyester or other polyhdric alcohol. If the diisocyanate is added as a prepolymer, adjustment should be made in the content of the polyester component in the polyester emulsion. As previously intimated, if the diisocyanate is added with a portion of the polyester as a prepolymer, the tertiary amine catalyst may be incorporated in either or both components of the foamable mixture.

The following are illustrative of the range in proportions of the several components which may be employed in the preparation of flexible polyurethane foams in accordance with the provisions of this invention.

|  | Parts by weight |
|---|---|
| Polyester | 100 |
| Water | 0.5 to 10 |
| Emulsifier | 0.1 to 10 |
| Catalyst | 0.1 to 10 |
| Alkaline agent | 0.01 to 10 |

The foregoing composition may be mixed with 25 to 75 parts of a diisocyanate.

The use of basic materials to polyesters employed to react with a diisocyanate or a prepolymer thereof is illustrated by the following examples, in which the product as obtained have improved properties with respect to softness and the stress-strain curve. In all instances, the foam volume is very good.

Example I

In this example, a polyester was employed which was the product of esterification of a mixture of:

| | Moles |
|---|---|
| Adipic acid | 16 |
| Diethylene glycol | 18 |
| Glycerol | 1 |

The mixture was catalyzed with 0.1 percent by weight based upon the charge of tolylene sulfonic acid and was esterified by heating, accompanied by the removal of water of reaction from the mixture, until a product having a viscosity of $Z_4$ to $Z_6$, a hydroxyl value of 60 to 80 and a water content of less than 0.2 percent was obtained. A foamable charge was then made up from this polyester of the following composition:

| | Grams |
|---|---|
| Polyester | 100 |
| Emulsifier (Emcol–H–77) | 2 |
| Sodium carbonate | 0.4 |
| $H_2O$ | 2 |
| Catalyst (N-methyl morpholine) | 1 |
| Tolylene diisocyanate (Mondur–TD) | 25 |

In forming the mixture the polyester, the emulsifier, the sodium carbonate, water and the catalyst were preliminarily made up as an emulsion. This emulsion was then incorporated with the tolylene diisocyanate by agitating the two components in an appropriate container. The components were readily mixed in approximately 22 seconds. The mixture foamed and set in 1 minute and 26 seconds. It was carried to a final cure at 220° F. in a period of 30 minutes. The product obtained had a low density, was soft and had a smooth stress-strain curve. Apparently, at least a large number of the cells of the product were intercommunicating.

Example II

The polyester employed in this example corresponded to that of Example I. A solution comprising 15 grams of anhydrous sodium carbonate in 100 grams of distilled water was prepared. This was of a normality of 2.83 and had a pH of about 12.3. An emulsion was then made up comprising:

| | Parts by weight |
|---|---|
| Polyester | 100 |
| Sodium carbonate solution | 2.3 |
| Emulsifier (Emcol–H–77) | 2 |
| N-methyl morpholine | 0.2 |

This emulsion was then mixed with 25 grams of Mondur–TD. The emulsion and the diisocyanate were mixed over a period of 21 seconds. The mixture foamed and set in a period of 1 minute and 25 seconds. Apparently the sodium carbonate of the mixture acted to catalyze the reaction.

Example III

In this example, the polyester was again the same as that disclosed in Example I. An emulsion was prepared comprising:

| | Grams |
|---|---|
| Polyester | 100 |
| Emulsifier (Emcol–H–77) | 2 |
| Sodium carbonate solution | 2.2 |
| N-methyl morpholine | 1 |

The sodium carbonate solution comprised 10 grams of sodium carbonate dissolved in 100 grams of distilled water.

The foregoing emulsion was mixed with 25 grams of tolylene diisocyanate known as Mondur–TD over a period of 30 seconds. The resultant mixture foamed and set in 2 minutes, 14 seconds. The foam was cured for 30 minutes at 220° F. to provide an excellent product which had a density of 4.75 pounds per cubic foot and gave a Pandux reading of 68. This product could be used as a filler for cushions or mattresses or the like.

Example IV

In this example, a prepolymer was prepared comprising:

| | Parts |
|---|---|
| Polyester as in Example I | 100 |
| Tolylene diisocyanate | 50 |

The mixture was reacted to provide a liquid material. The reaction can be effected with or without catalyst and with or without heat. An emulsion was prepared comprising:

| | Parts by weight |
|---|---|
| Polyester (per Example I) | 100 |
| Anhydrous $Na_2CO_3$ | 0.6 |
| Water | 4 |
| Emulsifier (Emcol–H–77) | 4 |
| N-methyl morpholine | 2.0 |

The emulsion was incorporated with the above prepolymer by agitation and was foamed and then cured at 220° F. for 30 minutes.

The product was soft and of low density (5.7 pounds per cubic foot) for a prepolymer type flexible product.

Example V

In this example, a prepolymer was employed comprising 100 grams of polyester corresponding to that of Example I and 50 grams of tolylene diisocyanate mixed isomers. The mixture was reacted without substantial amounts of water and without catalyst. The prepolymer was mixed with 100 grams of added polyester, 4.6 grams of a solution of 15 grams of sodium carbonate in 100 grams of water, 2 grams of N-methyl morpholine and 4 grams of Emulsifier (Emcol–H–77). The mixing time was 42 seconds. The mixture was cured for 30 minutes at 220° F. The product was a good, soft, flexible foam. The density in pounds per cubic foot was 5.7. The density upon a like basis of product from a similar mixture but containing no sodium carbonate usually is in a range of about 9 to 11.

Example VI

In this example, the N-methyl morpholine employed as a catalyst in the preceding examples was replaced by a quaternary ammonium salt, namely that obtained by the reaction of N-methyl morpholine and acetic anhydride. An emulsion was prepared comprising:

| | Parts by weight |
|---|---|
| Polyester (as per Example I) | 100 |
| Emulsifier (Emcol–H–77) | 2 |
| Sodium carbonate solution (15 grams in 100 grams of water) | 2.3 |
| Catalyst | 2 |

To an emulsion of the foregoing ingredients was added 25 grams of tolylene diisocyanate mixed isomers sold as Mondur–TD. The mixing time was 24 seconds. The mixture was cured for 30 minutes at 220° F. to provide a soft, flexible foam of a density in pounds per cubic feet of 5.28.

Example VII

In accordance with the provisions of this example, sodium hydroxide is employed as an alkaline agent. An emulsion was prepared of the composition:

| | Parts by weight |
|---|---|
| Polyester (as per Example I) | 100 |
| Emulsifier (Emcol–H–77) | 2 |
| Sodium hydroxide aqueous solution (1 normal) | 2 |
| N-methyl morpholine | 1 |

The emulsion was mixed with tolylene diisocyanate mixed isomers sold commercially as Mondur–TD in a proportion of 25 grams. Mixing was effected in 24 seconds. The mixture exhibited a set time of 1 minute 30 seconds as determined by cutting the surface of the mixture at intervals with an instrumentality such as a spatula and observing the time when the cut ceases to heal. The foregoing mixture was cured for 30 minutes at 220° F.

to provide a foam of good softness and of a density of 4.2 pounds per cubic foot.

Example VIII

In this example, the water is added in latent form in the trihydrate of sodium acetate. The alkaline material is added in dry form. The trihydrate decomposes to liberate water. In the example, 90.2 parts by weight of polyester prepared in accordance with the provisions of Example I is mixed with 14.3 grams of a paste comprising 35 percent by weight of sodium acetate trihydrate dispersed in the polyester which was the same as that of Example I. The alkaline agent comprised 0.9 part by weight of a paste which was a mixture of 140 parts by weight of sodium carbonate in 260 parts by weight of polyester. To the mixture is also added 2 parts by weight of emulsifier, namely Emcol–H–77, and 0.6 part by weight of catalyst, namely N-methyl morpholine. These several ingredients are agitated together and are then incorporated with 25 parts by weight of tolylene diisocyanate mixed isomers, sold as Mondur–TD. The mix time is 35 seconds and the set time is 3 minutes. The mixture cures within 30 minutes at 220° F. The resultant foam is of low density and of good texture.

Example IX

In this example, the use as an alkaline agent of a quaternary ammonium hydroxide, such as trimethyl benzyl ammonium hydroxide, is illustrated. The foamable mixture is prepared by mixing polyesters, such as that from Example I, in a proportion of 100 parts by weight with 2 parts by weight of a solution of 11.44 grams of trimethyl benzyl ammonium hydroxide in 100 grams of water. To the mixture is added 2 parts by weight of an emulsifier, namely Emcol–H–77, and 1 part by weight of N-methyl morpholine as a catalyst. These several ingredients are thoroughly intermixed and when a foam is to be prepared 25 parts by weight of tolylene diisocyanate mixed isomers, such as Mondur–TD, is added. The mixture may be cured and foamed by heating for 30 minutes at 220° F.

Emphasis has been placed upon the use of an alkaline material such as a salt of a strong base and a weak acid as agents for promoting the reaction between the polyester and the diisocyanate and for increasing the softness and other desirable properties of the foamed products.

It has also been discovered that if the polyester component is to be stored for a substantial period of time before use, it is often advantageous to add all or a part of the alkaline material to the polyester before such period of storage. This is true because the conventional polyesters such as those employed in forming flexible foams, often exhibit a tendency to hydrolyze during storage, with gradual build up of acid value. If an aqueous solution of an alkaline agent such as a salt of a weak acid and a strong base is added to the polyester before storage, this tendency is reduced or eliminated.

The effect of an alkaline salt in stabilizing the polyester is illustrated by the following example.

Example X

The polyester of this example was of the same components and had been prepared in the presence of the same acid catalyst as that of Example I. The viscosity initially was $Z_4$ and the acid number was 3.3. To this polyester was added 1.0 percent by weight based upon the polyester of water and 0.3 percent upon a like basis of sodium carbonate, the latter being dissolved in the water. This mixture was stored for 6 weeks, at the end of that time, the viscosity was substantially unchanged and the acid value was 2.4. The polyester was quite stable and was well suited for mixing with a diisocyanate to form a foam. A foam was prepared from the polyester after storage by adding to the same:

| | Parts by weight |
|---|---|
| Emulsifier (Emcol–H–77) | 2 |
| Catalyst (N-methyl morpholine) | 1 |
| Water | 1 |

The resultant emulsion was incorporated with 25 parts by weight of tolylene diisocyanate as mixed isomers (Mondur–TD). The mixture foamed and was cured for 30 minutes at 220° F. for 30 minutes.

The product was a flexible foam of low density.

A second and similar sample of polyester constituting a control was stored without water and without stabilizer, but under a humid atmosphere for a like period. At the end of that time, the viscosity had changed from $Z_4$ to Y; the acid value had risen from 3.3 to 30.3. This rise in acid value indicated that a substantial degree of hydrolysis had taken place during storage. Without the stabilizer, this polyester was not well adapted to withstand storage.

Emulsifier such as those disclosed herein are optional during the period of storage and may be added before or after such period.

The entire amount of water required in the ultimate reaction with the diisocyanate to form a polyurethane foam may be incorporated with the sodium carbonate. However, it is usually preferred to incorporate only a part (e.g., 50 percent) of the water. The rest may be added by the user at any convenient stage before the polyester is reacted with the diisocyanate.

In the foregoing examples, the polyester disclosed may be replaced by other polyesters having appropriate hydroxyl values; e.g., in the range of 15 to 160 or thereabouts. The following constitutes an example of such polyester:

| | Moles |
|---|---|
| Adipic acid | 3 |
| Glycerine | 1 |
| Butanediol-1,3 | 3.6 |

This mixture was catalyzed with p-tolylene sulfonic acid and cooked to provide a polyester having a hydroxyl value of 135. This polyester can be substituted for the polyester of the example. The resultant product is a foamed polyurethane of greater stiffness than that of the former examples.

The dicarboxylic acid of Example I may be replaced by stoichiometric equivalencies of any of the other acids. Similarly, the diethylene glycol of Example I can be replaced in toto or in part by a stoichiometric equivalency of any of the other dihydroxy alcohols; the glycerol of Example I may be replaced by a stoichiometric equivalency of any of the other polyhydric compounds listed.

The forms of the invention as herein disclosed are to be considered as being by way of example rather than limitation. It will be apparent to those skilled in the art that various modifications may be made therein without departure from the spirit of the invention or the scope of the appended claims.

We claim:

1. A method of preparing a foamed, flexible polyurethane resin comprising mixing and reacting essentially the following components: (A) 25–75 parts by weight of an aromatic diisocyanate, and (B) a mixture comprising (1) 100 parts by weight of a polyester of alcohol containing two to six hydroxyl groups and a dicarboxylic acid containing 4 to 10 methylene groups in the chain between the carboxyl groups, said polyester being of a hydroxyl value in a range of about 15 to 160, (2) water in an amount of 0.5 to 10 parts by weight, and (3) sodium carbonate in an amount of 0.01 to 10 parts by weight, the sodium carbonate being dissolved in the water.

2. The method of preparing a foamed, flexible polyurethane resin characterized by softness and flexibility, which comprises mixing and reacting essentially the following components: (A) 25 to 75 parts by weight of tolylene diisocyanate with (B) a mixture comprising (1)

100 parts by weight of a polyester of an alcohol containing 2 hydroxyl groups and a dicarboxylic acid containing from 4 to 10 methylene groups between the carboxyl groups said polyester being of a hydroxyl value of about 15 to 160; (2) 0.5 to 10 parts by weight of water, and (3) 0.01 to 10 parts by weight of an alkali metal carbonate dissolved in the water.

3. In a method of preparing a foamed, flexible polyurethane resin, the steps of mixing and reacting essentially the following components: (A) 25 to 75 parts by weight of tolylene diisocyanate, and (B) a mixture comprising:

| | Parts by weight |
|---|---|
| Polyester of an alcohol containing from 2 to 6 hydroxyl groups and a dicarboxylic acid containing 4 to 10 methylene groups between the carboxyl groups, said polyester being of a hydroxyl value of 60 to 80, and an acid value of 1 to 15 | 100 |
| Tertiary amine | 0.5 to 10 |
| Alkali metal carbonate | 0.01 to 10 | the alkali metal carbonate being dissolved in the water.

4. In a method of preparing a foamed, flexible polyurethane resin, the steps of mixing and reacting essentially the following components: (A) 25 to 75 parts by weight of tolylene diisocyanate, and (B) a mixture comprising:

| | Parts by weight |
|---|---|
| Polyester of an alcohol containing 2 to 6 hydroxyl groups and a dicarboxylic acid containing 4 to 10 methylene groups between the carboxyl groups, said polyester being of a hydroxyl value of 15 to 160 and an acid value of 1 to 15 | 100 |
| Tertiary amine | 0.1 to 10 |
| Water | 0.5 to 10 |
| Alkali metal compound | 0.01 to 10 | said compound being selected from the group consisting of:

Sodium carbonate
 Sodium sulfide
 Potassium carbonate
 Trisodium phosphate
 Sodium hydroxide
 Potassium hydroxide the compound being dissolved in the water.

References Cited in the file of this patent

UNITED STATES PATENTS

| | | |
|---|---|---|
| 2,137,994 | Whipple | Nov. 22, 1938 |
| 2,249,950 | Fuller | July 22, 1941 |
| 2,577,279 | Simon et al. | Dec. 4, 1951 |
| 2,650,212 | Windemuth | Aug. 25, 1953 |

FOREIGN PATENTS

| | | |
|---|---|---|
| 716,422 | Great Britain | Oct. 6, 1954 |